United States Patent
Hauk et al.

(10) Patent No.: US 11,536,412 B2
(45) Date of Patent: Dec. 27, 2022

(54) LINE ELEMENT WITH DAMPING ELEMENT

(71) Applicant: Westfalia Metal Hoses GmbH, Hilchenbach (DE)

(72) Inventors: Stefan Hauk, Hilchenbach (DE); Oliver Selter, Attendorn (DE); Dietmar Baumhoff, Olpe (DE); Karl-Heinz Münker, Hilchenbach (DE); Andreas Gerhard, Wenden (DE); Michael Henkelmann, Hilchenbach (DE); David Christopher Siebels, Dortmund (DE); Sascha Jan Sckudlarek, Freudenberg (DE); Matthias Weiss, Hilchenbach (DE); Karsten Schenk, Schwalmstadt (DE)

(73) Assignee: WESTFALIA METAL HOSES GMBH, Hilchenbach (DE)

( * ) Notice: Subject to any disclaimer, the term of this patent is extended or adjusted under 35 U.S.C. 154(b) by 446 days.

(21) Appl. No.: 16/618,290

(22) PCT Filed: May 22, 2018

(86) PCT No.: PCT/EP2018/063382
§ 371 (c)(1),
(2) Date: Nov. 29, 2019

(87) PCT Pub. No.: WO2018/219719
PCT Pub. Date: Dec. 6, 2018

(65) Prior Publication Data
US 2020/0116288 A1 Apr. 16, 2020

(30) Foreign Application Priority Data

Jun. 2, 2017 (DE) ...................... 10 2017 112 264.8
Jan. 31, 2018 (DE) ...................... 10 2018 102 101.1

(51) Int. Cl.
*F16L 55/04* (2006.01)
*F01N 13/18* (2010.01)
(Continued)

(52) U.S. Cl.
CPC ........ *F16L 55/041* (2013.01); *F01N 13/1816* (2013.01); *F16L 11/15* (2013.01);
(Continued)

(58) Field of Classification Search
CPC .......... F16L 55/041; F16L 11/15; F16L 11/16; F16L 11/20; F16L 27/1004; F16L 27/11; F01N 13/1816
(Continued)

(56) References Cited

U.S. PATENT DOCUMENTS 5,340,165 A 8/1994 Sheppard
6,230,748 B1 * 5/2001 Krawietz ............... F16L 27/111
138/123

(Continued)

FOREIGN PATENT DOCUMENTS

DE 102008001297 10/2008
DE 102010037162 3/2011
(Continued)

OTHER PUBLICATIONS

International Search Report issued by the European Patent Office in International Application PCTEP2018/063382 dated Jul. 10, 2018.

*Primary Examiner* — Craig M Schneider
*Assistant Examiner* — David R Deal
(74) *Attorney, Agent, or Firm* — Henry M. Feiereisen LLC

(57) ABSTRACT

A line element includes an inner element, an outer element surrounding the inner element, and a damping element arranged between the inner element and the outer element. The damping element can be made, for example, of knitted (Continued)

wire fabric or a stripwound hose. The damping element can be made in particular of a more easily wearing material than the outer element and/or the inner element, for example of copper.

16 Claims, 4 Drawing Sheets

(51) Int. Cl.
  *F16L 11/15* (2006.01)
  *F16L 11/16* (2006.01)
  *F16L 11/20* (2006.01)
  *F16L 27/10* (2006.01)
  *F16L 27/11* (2006.01)

(52) U.S. Cl.
  CPC ............... *F16L 11/16* (2013.01); *F16L 11/20* (2013.01); *F16L 27/1004* (2013.01); *F16L 27/11* (2013.01)

(58) Field of Classification Search
  USPC ......................................................... 138/121
  See application file for complete search history.

(56) References Cited

U.S. PATENT DOCUMENTS

| | | | |
|---|---|---|---|
| 8,453,680 B2* | 6/2013 | Weiss | F01N 13/16 285/47 |
| 10,612,716 B1* | 4/2020 | Campbell | F16L 59/153 |
| 10,883,412 B2* | 1/2021 | Lee | F16L 27/113 |
| 2008/0156388 A1* | 7/2008 | Wintrebert | F16L 13/02 138/135 |
| 2008/0264509 A1 | 10/2008 | Weiss et al. | |
| 2011/0209790 A1* | 9/2011 | Weiss | F01N 13/16 138/26 |
| 2012/0125192 A1 | 5/2012 | Weiss et al. | |
| 2016/0003388 A1* | 1/2016 | Barbely | F16L 51/025 285/226 |
| 2018/0224028 A1 | 8/2018 | Schenk et al. | |

FOREIGN PATENT DOCUMENTS

| | | |
|---|---|---|
| DE | 102011053131 | 5/2012 |
| DE | 102012013946 | 1/2014 |
| DE | 202015104177 | 1/2016 |
| DE | 102015102258 | 8/2016 |
| WO | WO 2016/005096 | 1/2016 |
| WO | WO 2016/110737 | 7/2016 |
| WO | WO 2017/016728 | 2/2017 |

* cited by examiner

LINE ELEMENT WITH DAMPING ELEMENT

CROSS-REFERENCES TO RELATED APPLICATIONS

This application is the U.S. National Stage of International Application No. PCT/EP2018/063382, filed May 22, 2018, which designated the United States and has been published as International Publication No. WO 20181219719 and which claims the priorities of German Patent Applications, Serial No. 10 2017 112 264.8, filed Jun. 2, 2017, and Serial No. 10 2018 102 101.1, filed Jan. 31, 2018, pursuant to 35 U.S.C. 119(a)-(d).

BACKGROUND OF THE INVENTION

The invention relates to a line element with an inner element, an outer element, and a damping element arranged in-between. Such line elements are preferably installed in exhaust pipes in motor vehicles and connect individual, rigid line units flexibly with each other.

Vibrations that are continuously encountered in the exhaust tract of motor vehicles are caused, for example, by imbalances of rotational elements in the engine, turbo or auxiliary units, by the pulsed pressure patterns of the combustion engine, or by the travel movements in conjunction with road bumps and their feedback into the chassis.

In this regard, line elements or "decoupling elements" have the task to decouple such vibrations and movements in the exhaust system of motor vehicles. In addition, they compensate for possible installation tolerances.

In view of ever decreasing sizes, the flexibility of line elements must be increased, thereby increasing the tendency to oscillate with natural frequencies, so that the service life is reduced. Good attenuation of the line elements is therefore important.

DE 20 2015 104 177 U1 discloses different embodiments of line elements, which are composed of an inner hose and an outer hose, with at least one of the hoses normally being gas-tight. Further prior art can be found in DE 10 2008 001 297 A1, DE 10 2011 053 131 A1, DE 10 2010 037 162 A1, DE 10 2015 102 258, WO 2017/016728 A1 and DE 10 2012 013946 A1. All mentioned documents are incorporated by reference in their entirety in this application.

SUMMARY OF THE INVENTION

In view of this, it was an object of the present invention to provide a simple and robust alternative construction of a line element with damping element.

This object is attained in accordance with the invention by a line element which includes
an inner element;
an outer element surrounding the inner element;
a damping element arranged between inner element and outer element and made, for example, of knitted wire fabric or a strip wound hose.

Advantageous refinements of these line elements are set forth in the subclaims.

The term "knitted fabric" generally relates in this context to a regular or irregular arrangement of threadlike or fibrous parts, for example metal wires. Due to its structure with many gaps and bends of the threads/fibers, the knitted fabric attains a relatively high elasticity and good damping properties as a result of the relative movement and friction between individual threads/fibers.

The inner element and/or the outer element are in contact with the damping element preferably at points, along a line, over part of an area or over the entire area.

The inner element and/or the outer element preferably involves a stripwound hose, in particular a metallic stripwound hose. Such stripwound hoses are known in various embodiments (single-layer, multi-layer, interlocking, with inner scales and/or outer scales, etc.). Typical embodiments are described, for example, in DE 20 2015 104 177 U1.

Furthermore, the inner element or in particular the outer element of the line element may be formed as a corrugated bellows, a wound bellows, or a membrane bellows. While corrugated bellows are typically made from a tube through internal high-pressure forming process in combination with an upsetting operation, wound bellows and membrane bellows are welded rotationally symmetric or helically corrugated elements in the profile area, which elements have either corrugations perpendicular to the axis of rotation or spiral-shaped corrugations. A wound bellows structure can preferably be interlocked formfittingly or welded in overlapping manner or via a material joint. Such elements are described, for example, in DE 10 2008 001 297 A1 or DE 10 2011 053 131 A1.

In general, the material of the damping element is chosen such that wear is minimized by the friction against the inner element and/or outer element. In particular, a removal of the material of the outer element/inner element can be prevented or at least reduced in the contact region. This can be achieved, for example, by a suitable material selection and/or material treatment of the contacting layers of damping element and inner element/outer element.

The damping element is preferably made of a more easily wearing material than the inner element and/or the outer element. In particular, the surface of the damping element may be softer than the material of the outer element and/or the inner element (measured, for example, by the methods HR or HV according to Rockwell or Vickers), so that the material of the damping element and not of the outer element or the inner element is removed by the frictional contact.

As already mentioned, the damping element can optionally contain a knitted wire fabric or be made entirely of it.

In the above case, the damping element preferably includes (at least) one wire (thread) with a coating.

Furthermore, the damping element may include or be made of a flexible stripwound hose, a corrugated bellows, a membrane bellows structure or a wound bellows structure. For these embodiments, the afore-made explanations with respect to the inner element or outer element apply analogously. In particular, the damping element may be a flexible stripwound hose of copper.

As already mentioned, such a stripwound hose may find application in various embodiments (single-layer, multi-layer, interlocking, with inner scales and/or outer scales, etc., cf. DE 20 2015 104 177 U1).

Furthermore, a stripwound hose forming the damping element can preferably have a lower stiffness than the inner element and/or than the outer element (i.e., same forces or torques cause greater changes in the shape of the damping element than in elements with higher stiffness). Typically, the friction loss caused during operation of the damping element is less than that of the inner element and/or outer element, i.e. its deformation plays a secondary role for the damping behavior of the overall line element.

Furthermore, the surface of the damping element, the inner element, and/or the outer element may, optionally, be conditioned (cf. WO 2017/016728 A1).

The damping element may preferably contain or be made of at least one of the following materials: copper, copper alloys, bronze, aluminum, aluminum alloys, stainless steel, steel, zinc, zinc phosphate, titanium, tantalum, nickel-based alloys, graphite, aramids (e.g. Kevlar®), brass and/or molybdenum sulfide.

Furthermore, the outer element and/or the inner element may contain or be made of at least one of the following materials: stainless steel, steel, zinc, aluminum alloys, copper, titanium, tantalum, nickel-based alloys, brass, and/or bronze.

According to a refinement of the invention, the inner element and/or the outer element may have a non-circular cross section at least in an axial section of the line element. In particular, it may have a polygonal cross-section, with the corners typically being rounded. Furthermore, a non-round inner element/outer element is normally combined with a round outer element/inner element. As a result of the out-of-roundness, a point contact, line contact or surface contact is easier to make. The damping element normally adapts to the shape of the cavity formed between the inner element and the outer element.

Further information about fine elements with a coaxial arrangement of an inner element and an outer element can be found in DE 20 2015 104 177 U1, which is incorporated by reference in its entirety in the present application.

BRIEF DESCRIPTION OF THE DRAWING

In the following, the invention will be explained in more detail by way of example with the aid of the figures. It is shown in.

DETAILED DESCRIPTION OF PREFERRED EMBODIMENTS

Figure 1:
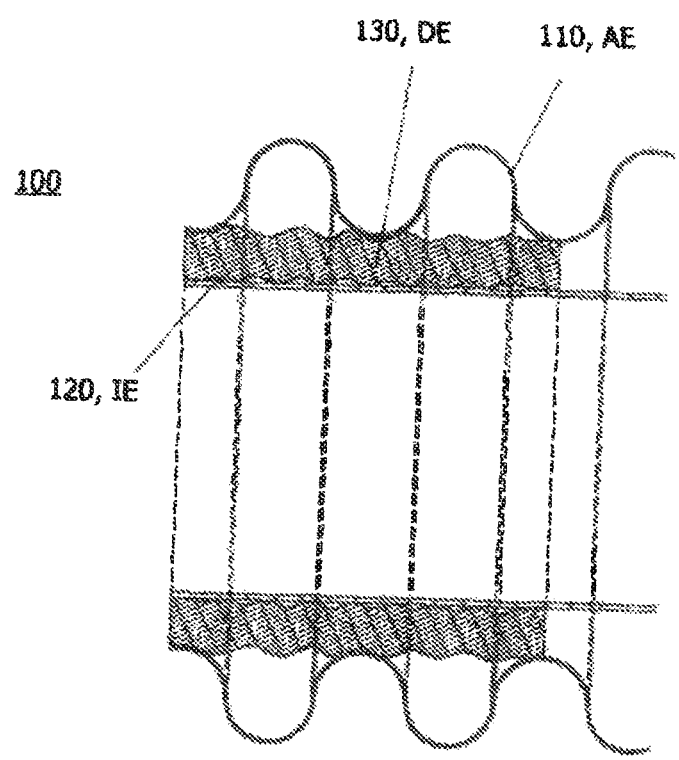
FIG. 1 a longitudinal section through a line element according to the invention with a knitted wire fabric as a damping element.

FIG. 1 shows a longitudinal section through a decoupling element or line element 100 in accordance with the invention, which is formed from the stripwound hose 120 as inner element (in the figures also designated as "IE"), an outer element 110 ("AE"), and a damping element 130 ("DE"). In the example shown, the outer element AE is a ring-corrugated membrane bellows 110.

The damping element 130 may extend axially over the entire length or only over a part of the line element 100.

The damping element 130 is formed for example by a knitted fabric of copper wire. This knitted copper fabric is drawn over the inner element 120 during assembly of the line element 100 and then mounted in the envelope of the outer element 110.

The advantages of the illustrated decoupling element 100 reside in a lesser manufacturing complexity, the use of standard components, and good damping properties. Furthermore, the wire thickness of the damping element 130 enables virtual "adjustability" of the service life thereof.

The knitted fabric can preferably be single-thread, two-thread, three-thread, four-thread or multi-thread. The wire of the knitted fabric typically has a diameter of approx. 0.1 up to 0.5 mm, preferably from approx. 0.5 mm to 1.0 mm, or from approx. 1.0 mm to 2.6 mm.

The material of knitted fabric for the damping element 130 contains or is made of preferably copper, copper alloys, bronze, aluminum and other non-ferrous metals. Different materials can hereby be knitted when more than 2 threads are present.

Further, the wire of the damping element 130 can have coatings having friction-optimized, strength-increasing or similar functions.

Figure 2:
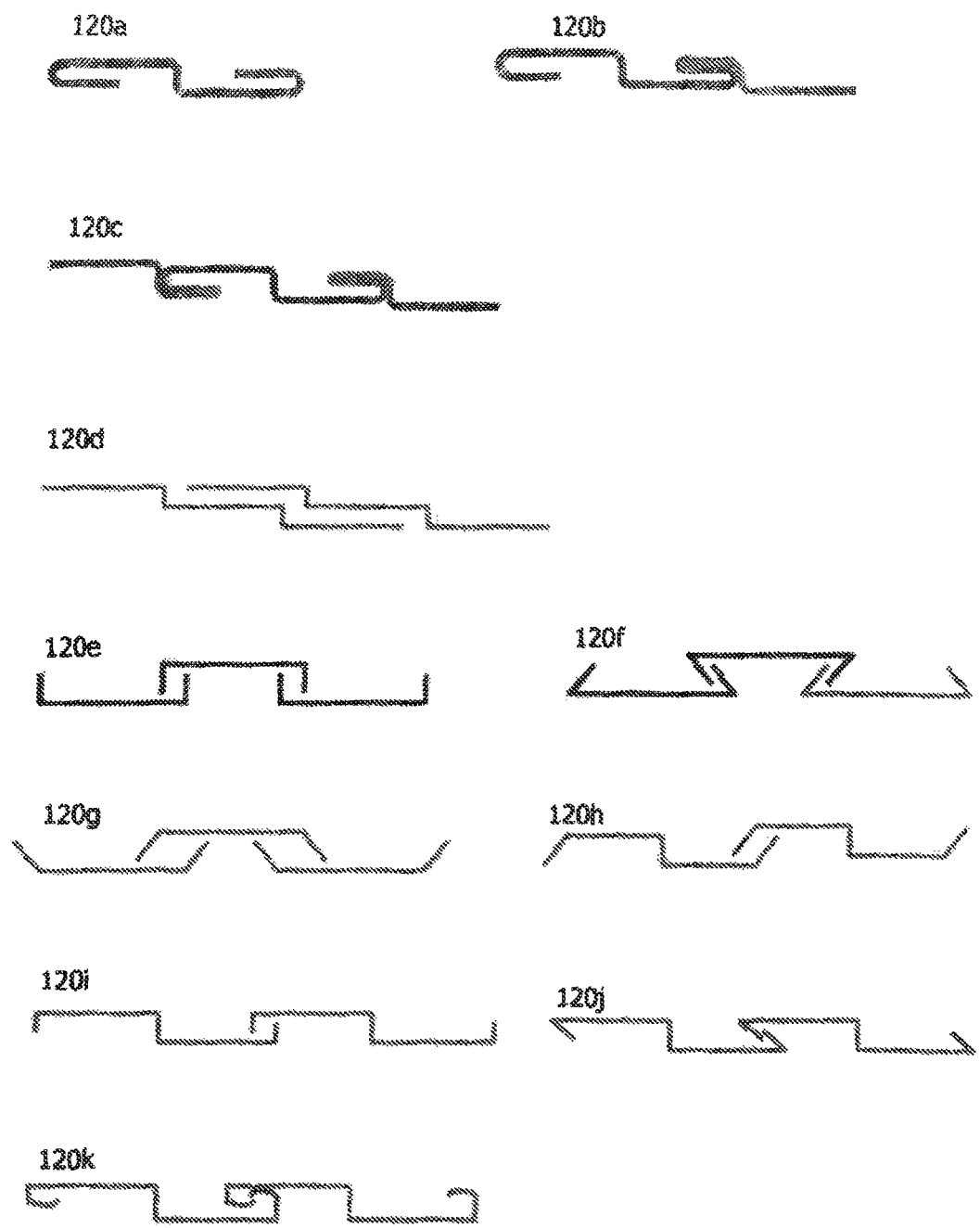
FIG. 2 various possible strip geometries of the inner element, the outer element, and the damping element.

FIG. 2 illustrates (not exhaustive) various possible strip geometries of the inner element IE (shown in the longitudinal section as one, two or three strip turns). Shown are an interlocking hose 120a, an interlocking hose 120b with outer scale, a double-scale interlocking hose 120c with inner scales and outer scales, as well as further overlapping and/or interlocked geometries 120d-120k. The material of the inner element IE is preferably stainless steel. The thickness of the winding strip is typically approx. 0.07 mm to 0.26 mm, preferably approx. 0.26 mm to 0.5 mm.

Figure 3:
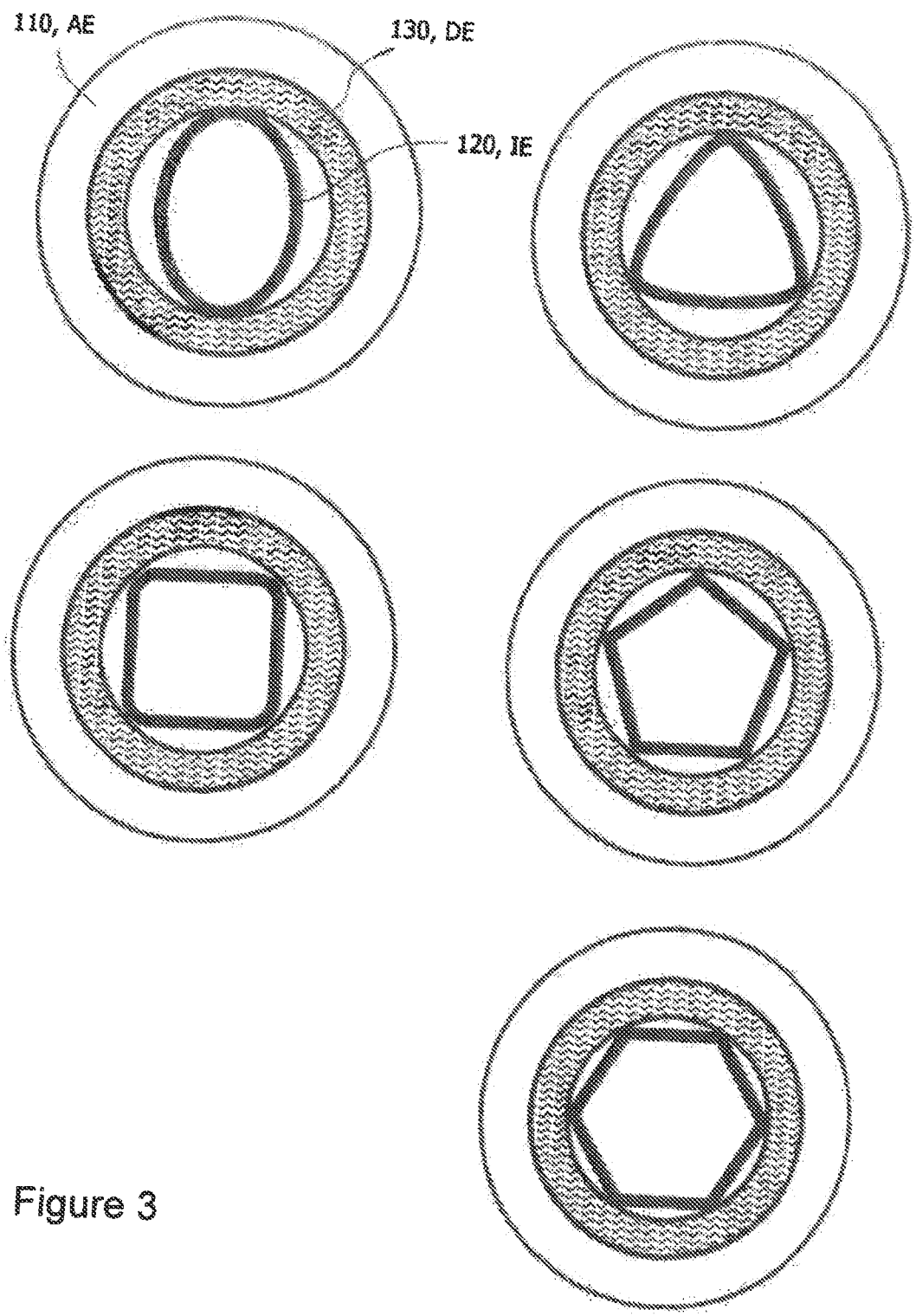
FIG. 3 cross sections through line elements according to the invention with an oval, triangular, quadrangular, pentagonal and hexagonal inner element, FIG. 4 a longitudinal section through a line element according to the invention with a stripwound hose as a damping element.

In preferred embodiments, the inner element IE or the outer element AE has a non-round cross-section (while the respectively other element of the line element has a round cross-section). It is particularly preferred when the inner element IE has a non-round and the outer element AE has a round cross-section, FIG. 3 illustrates in this regard, five front views of variants of a line element with a non-round inner element 120 and a circular outer element 110. The associated damping element 130 is also shown with a circular cross-section; it will, however, normally assume a shape, which more or less matches the available space.

Shown is an inner element with an oval, a triangular, a quadrangular, a pentagonal, and a hexagonal cross-section, though any other non-round geometries are possible.

Figure 4:
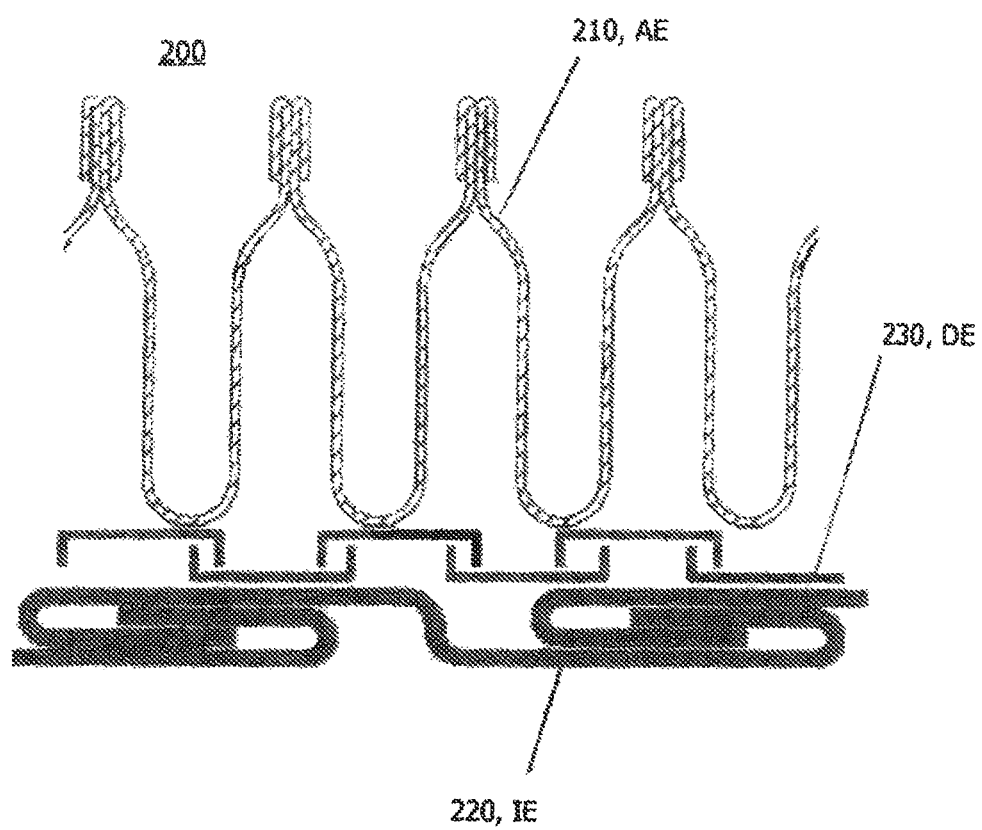

FIG. 4 shows a longitudinal section for a further embodiment of a line element 200 through an axial section of the wall. The line element 200 includes the following components:

An inner element 220 or IE, which is formed, for example, from an interlocking hose 120b according to FIG. 2.

A damping element 230 or DE, which is formed, for example, from an interlocked stripwound hose 120e according to FIG. 2. Preferably, this damping element 230 is made of a softer material than the adjacent inner element 220 or outer element 210, for example of copper or a copper-containing material. Furthermore, its stiffness is preferably less than that of the inner element 220 and/or that of the outer element 210.

An outer element 210 or AE, which is made here from a wound membrane bellows.

The damping element 230 is arranged coaxially between the inner element 220, lying on the inside, and the outer element 210, lying on the outside. Due to the contact with the inner element 220 and outer element 210, the stripwound hose 230 acts in a dampening manner and through suitable selection of its material prevents wear of inner element 220 and outer element 210.

The geometries shown in FIG. 2 may, of course, also be realized with a stripwound hose as a damping element, wherein the stripwound hose may have a round cross section or also a non-round cross-section. A non-round cross-section preferably has the same geometry (oval, triangular, quadrangular, pentagonal, etc.) as the non-round inner element (or the outer element if the latter is non-round). Furthermore, a non-round damping element DE can be combined with a round outer element and a round inner element.

In all line elements shown in the figures, the outer element AE can optionally be formed by a stripwound bellows, corrugated bellows or a rotationally symmetrical or helical corrugated membrane bellows which is welded in the upper profile area. Examples of such outer elements AE can be found in DE 10 2008 001 297 A1, DE 10 2011 053 131 A1, and DE 10 2013 104 446 A1.

The invention claimed is:

1. A line element, comprising:
   an inner element made of a flexible stripwound hose;
   an outer element arranged in surrounding relation to the inner element and made of a corrugated bellows, a membrane bellows structure or a wound bellows structure; and
   a damping element arranged between the inner element and the outer element, said damping element comprising or made of a wound corrugated winding strip having laterally overlapping or interlocking sides formed between adjacent strips to form a flexible stripwound hose.

2. The line element of claim 1, wherein the damping element is made of a material that wears off easier than a material of the inner element or the outer element.

3. The line element of claim 1, wherein the damping element comprises or is made of at least one material selected from the group consisting of copper, copper alloy, bronze, aluminum, aluminum alloy, stainless steel, steel, zinc, zinc phosphate, titanium, tantalum, ceramics, nickel, nickel-based alloy, graphite, aramid, brass, molybdenum sulfide, and any combination thereof.

4. The line element of claim 1, wherein at least one of the damping element, the inner element, and the outer element is conditioned at least locally on a surface.

5. The line element of claim 4, wherein the surface is conditioned by a thermal or thermochemical diffusion process or surface coating process.

6. The line element of claim 1, wherein at least one of the damping element, the inner element, and the outer element has a non-circular cross section at least in an axial portion of the line element.

7. The line element of claim 6, wherein the cross section is a polygonal cross-section.

8. The line element of claim 1, wherein the damping element has a stiffness which is less than a stiffness of the inner element or the outer element.

9. A line element, comprising:
   an inner element made of a flexible stripwound hose;
   an outer element arranged in surrounding relation to the inner element and made of a corrugated bellows, a membrane bellows structure or a wound bellows structure; and
   a damping element arranged between the inner element and the outer element, said damping element comprising or made of a corrugated bellows, a membrane bellows structure or a wound bellows structure.

10. The line element of claim 9, wherein the damping element is made of a material that wears off easier than a material of the inner element or the outer element.

11. The line element of claim 9, wherein the damping element comprises or is made of at least one material selected from the group consisting of copper, copper alloy, bronze, aluminum, aluminum alloy, stainless steel, steel, zinc, zinc phosphate, titanium, tantalum, ceramics, nickel, nickel-based alloy, graphite, aramid, brass, molybdenum sulfide, and any combination thereof.

12. The line element of claim 9, wherein at least one of the damping element, the inner element, and the outer element is conditioned at least locally on a surface.

13. The line element of claim 12, wherein the surface is conditioned by a thermal or thermochemical diffusion process or surface coating process.

14. The line element of claim 9, wherein at least one of the damping element, the inner element, and the outer element has a non-circular cross section at least in an axial portion of the line element.

15. The line element of claim 14, wherein the cross section is a polygonal cross-section.

16. The line element of claim 9, wherein the damping element has a stiffness which is less than a stiffness of the inner element or the outer element.

\* \* \* \* \*